(12) United States Patent
McCoy

(10) Patent No.: US 6,558,833 B2
(45) Date of Patent: May 6, 2003

(54) RECHARGING BATTERIES BY ELECTROLYTE TRANSFER

(76) Inventor: Reginald F.H. McCoy, 1354 NE. 31st Pl., Gainesville, FL (US) 32609

( * ) Notice: Subject to any disclaimer, the term of this patent is extended or adjusted under 35 U.S.C. 154(b) by 210 days.

(21) Appl. No.: 09/737,691

(22) Filed: Dec. 18, 2000

(65) Prior Publication Data
US 2002/0076581 A1 Jun. 20, 2002

(51) Int. Cl.⁷ .................................. H01M 2/40
(52) U.S. Cl. .................... 429/70; 429/81; 429/95; 320/103
(58) Field of Search ................ 429/70, 95, 72, 429/80, 81; 320/103

(56) References Cited

U.S. PATENT DOCUMENTS

| | | | |
|---|---|---|---|
| 3,996,064 A | 12/1976 | Thaller | |
| 4,127,701 A | 11/1978 | Symons et al. | |
| 4,485,154 A | 11/1984 | Remick et al. | |
| 4,786,567 A | * 11/1988 | Skyllas-Kazacos | ..... 429/105 X |
| 5,061,578 A | * 10/1991 | Kozuma et al. | ................ 429/3 |
| 5,318,865 A | 6/1994 | Kaneko et al. | |
| 5,612,148 A | 3/1997 | Zito | |

* cited by examiner

Primary Examiner—John S. Maples

(57) ABSTRACT

A battery system for electric vehicles in which replenishment of the energy content of the batteries is accomplished by pumping liquids into tanks on the vehicles from pumps at service stations, similar to, and in a comparable time to, the filling of the tanks of conventional vehicles. The system also extracts used liquids, which have been depleted of energy content, from the vehicles and returns them to the service station where they are recharged for subsequent supply to other vehicles.

1 Claim, 5 Drawing Sheets

RECHARGING BATTERIES BY ELECTROLYTE TRANSFER

BACKGROUND OF THE INVENTION

Many attempts have been made to produce an electrically-powered vehicle using electric motors powered from rechargeable storage batteries. These vehicles have all suffered from the disadvantage that electrical recharging of the batteries takes considerable time, usually a matter of some hours, which shortcoming has rendered this type of vehicle commercially unsuccessful. This invention describes systems for organizing batteries for vehicle or other uses whereby they can be rapidly recharged.

BRIEF SUMMARY OF THE INVENTION

This invention provides a system whereby the batteries of electrically-powered vehicles or other electrically-powered devices may be recharged by filling tanks with liquids that may be dispensed from pumps at service stations, thus avoiding the time required for the electrical recharging of such batteries. The refilling of tanks from service station pumps is a procedure with which the general public is familiar, which fact will foster the acceptance of this invention as applied to electrically-powered vehicles by potential customers. Furthermore the filling of the tanks on the vehicles can be accomplished at any of a plurality of service stations thus permitting the vehicles to have unlimited range of operation.

In addition this invention provides a system for use with electrically-powered vehicles which releases no exhaust substances into the environment by providing that the energy-containing liquids, having been used in the batteries and thereby having been depleted of their energy content, may be retained in tanks on the vehicles from which they may be removed at any of a plurality of service stations at which their energy content can be restored in batteries to which a source of electrical power is supplied, the liquids thereby being recharged to a state suitable to be used to fill the tanks of other electrically-operated vehicles. There is thus a closed cycle in which the liquids are (1) supplied to tanks on the vehicles, (2) used to provide energy to the batteries which power the vehicles, (3) stored after use on the vehicles, (4) removed from the vehicles at service stations, (5) charged with energy by electrical means, (6) resupplied to other vehicles. The operation of this invention is thus conducted without release of chemical substances into the environment.

The batteries to which this invention relates are such that the storage of energy is accomplished solely by changes in the chemical states of liquid electrolytes, the electrodes being unchanged as between the charged and discharged conditions of the battery, said electrodes serving solely to provide electrical contacts to the electrolytes. Such batteries are well known and go by the names of 'redox flow cell', or 'regenerative fuel cell'. U.S. Pat. Nos. 3,996,064; 4,485,154; 5,318,865; and 5,612,148 disclose examples of such batteries and methods of construction thereof. The batteries described in these patents are recharged electrically. U.S. Pat. No. 4,127,701 discloses a battery having a replaceable liquid electrolyte and an oxidizable metal stack which must periodically be replaced. The construction of the batteries forms no part of the present invention, which relates to systems for their use.

This invention is not restricted to use in conjunction with electrically-powered vehicles. The novelty of this invention consists in the recharging of batteries by the physical transfer of electrolytes from previously charged batteries, and the ability to thus recharge any of a plurality of discharged batteries by physical transfer of electrolytes from any of a plurality of previously charged batteries. The invention may be applied to any situation in which this is advantageous. Accordingly this invention may be used with any electrically-powered device operating from batteries where it is required that the time needed to replenish the energy content of a discharged battery should be minimal. For example, portable battery-operated electric power tools, golf carts, forklift trucks, and powered wheelchairs for the disabled. Other examples will be apparent to those skilled in the art.

DETAILED DESCRIPTION OF THE INVENTION

Figure 1:
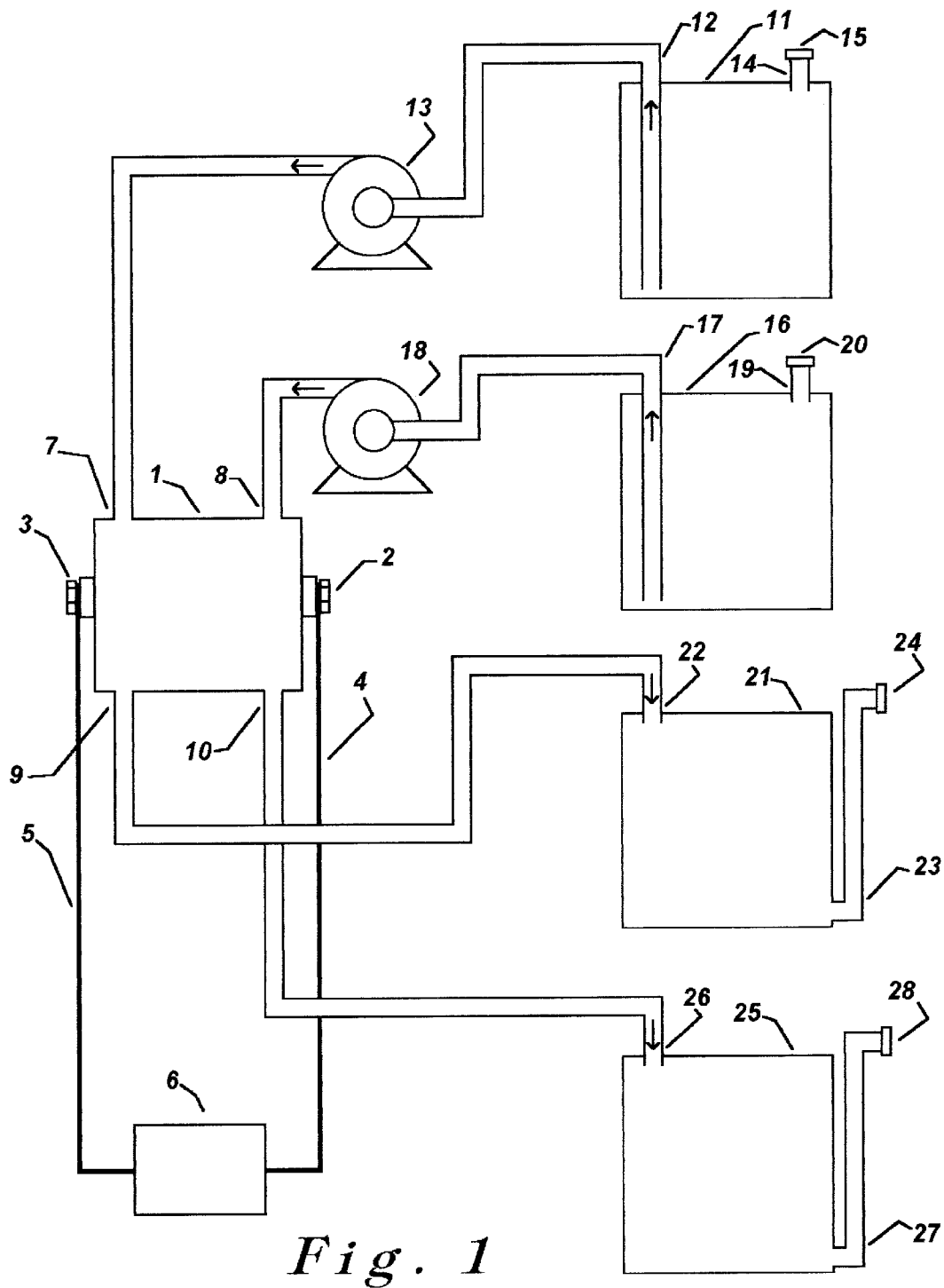
FIG. 1 shows one form for the implementation of this invention in an electrically-powered vehicle or other electrically-powered device.

In the following description the batteries which are used to supply power to loads are referred to as energizing batteries, and the batteries which are used to store energy obtained from external sources of electrical power are referred to as charging batteries. According to this invention said energizing batteries are recharged by physical interchange of liquid electrolytes with said charging batteries, without need for electrical connection between the charging batteries and the energizing batteries or between external sources of electrical power and the energizing batteries. The invention is orientated toward the provision of rapid recharging capability for electrically-powered vehicles and this usage will be emphasized in this description. The invention is not limited to vehicle use, it is also applicable to any rechargeable-battery powered electrical device. Accordingly the phrase "vehicles or devices" is employed in the following description to include such other usages.

This invention seeks to accomplish the objects listed above by providing a system whereby the batteries on the vehicles or devices constitute 'energizing batteries' as defined above, and separate stationary 'charging batteries' also as defined above, are provided at service stations. In said charging batteries the chemical conditions of liquid electrolytes are changed by passage of an electric current to the conditions that obtain in a charged battery. The electrolytes are then transferred to the energizing batteries on the vehicles or devices, from which the previous electrolytes have been removed, which batteries are then in a charged condition ready to power the vehicles or devices. The electrolytes which had been removed from the energizing batteries are transferred to the charging batteries in which their chemical conditions are restored to the charged state.

This recharging process may take an extended time without delaying the use of the vehicles or devices.

The batteries employed in the implementation of this invention are of a type known as 'redox flow cells'. Such batteries are known art and do not form a part of this invention, however to assist in understanding the operation of this invention a brief description of the redox (reduction-oxidation) cell is given here. Essentially the cell employs two electrolytes, separated by a membrane which is permeable only to ions that are common to both electrolytes. The electrodes are chemically non-reactive, for example graphite.

When such a cell is charged by passage of an electric current, the anode electrolyte is reduced and the cathode electrolyte is oxidized. Positive ions pass through the membrane to restore the chemical and electrical balance. On discharge, the anode electrolyte is oxidized and the cathode electrolyte is reduced. Again the positive ions pass through the membrane. The motion of positive ions conveys the electric current through the cell. The cells may be so constructed that the electrolytes may be supplied to the cells as needed for the reactions so that a larger quantity of electrolytes than can be accommodated in a cell at any one time may be subjected to the charging or discharging reactions. In this the redox flow cell differs from other types of cell in that the total energy capacity of the cell is determined by the total quantity of electrolytes, which may be stored external to the cell and supplied to it and removed from it in an ongoing process. The size of the cell itself determines the power output or charging rate of the cell.

As is normal, a plurality of cells electrically connected is referred to as a battery and this term is employed with this meaning in this application.

With the preceding explanation in mind the operation of this invention can now be described. The invention requires a charging battery or plurality of same, and an energizing battery or plurality of same, separate and distinct from the charging battery or batteries.

Referring to FIG. 1, at 11 is shown a tank which contains a supply of the anode electrolyte, in its charged (reduced) state, and at 16 is shown a tank containing a supply of the cathode electrolyte, also in its charged (oxidized) state. Pumps 13 and 18 draw supplies of the electrolytes from the tanks through pipes 12 and 17 and deliver them to the energizing battery 1 through pipes 7 and 8. Battery 1 is of the type already discussed. Its internal operation is not part of this application, but it should be understood that pipes 7 and 8 deliver the electrolytes to all cells of which the battery is composed.

The cells comprising the battery are internally electrically connected, the end cells being connected to terminals 2 and 3 from which current may be drawn through wires 4 and 5 to supply to load 6, which may be the driving mechanism of an electrically-propelled vehicle, or any other electrically powered device.

As previously explained, the electrolytes are supplied to the battery as needed and, having undergone the chemical reactions which produce the electrical output, they are removed to permit fresh electrolytes to enter the battery. In FIG. 1 the electrolytes exit the battery through pipes 9 and 10 and are supplied by pipes 22 and 26 to tanks 21 and 25 which contain the used (oxidized) anode electrolyte and used (reduced) cathode electrolyte respectively. Since the battery remains filled the action of pumps 13 and 18 forces the used electrolytes to exit.

Tanks 11 and 16 are provided with filler pipes 14 and 19, which are normally closed by caps 15 and 20. Tanks 21 and 25 are provided with drain pipes 23 and 27, also normally closed by caps 24 and 28. These filler and drain pipes permit connection to the supply and extraction hoses of a charging battery system at a service station, such as, but not restricted to, those described with relation to FIG. 4 and FIG. 5.

Figure 2:
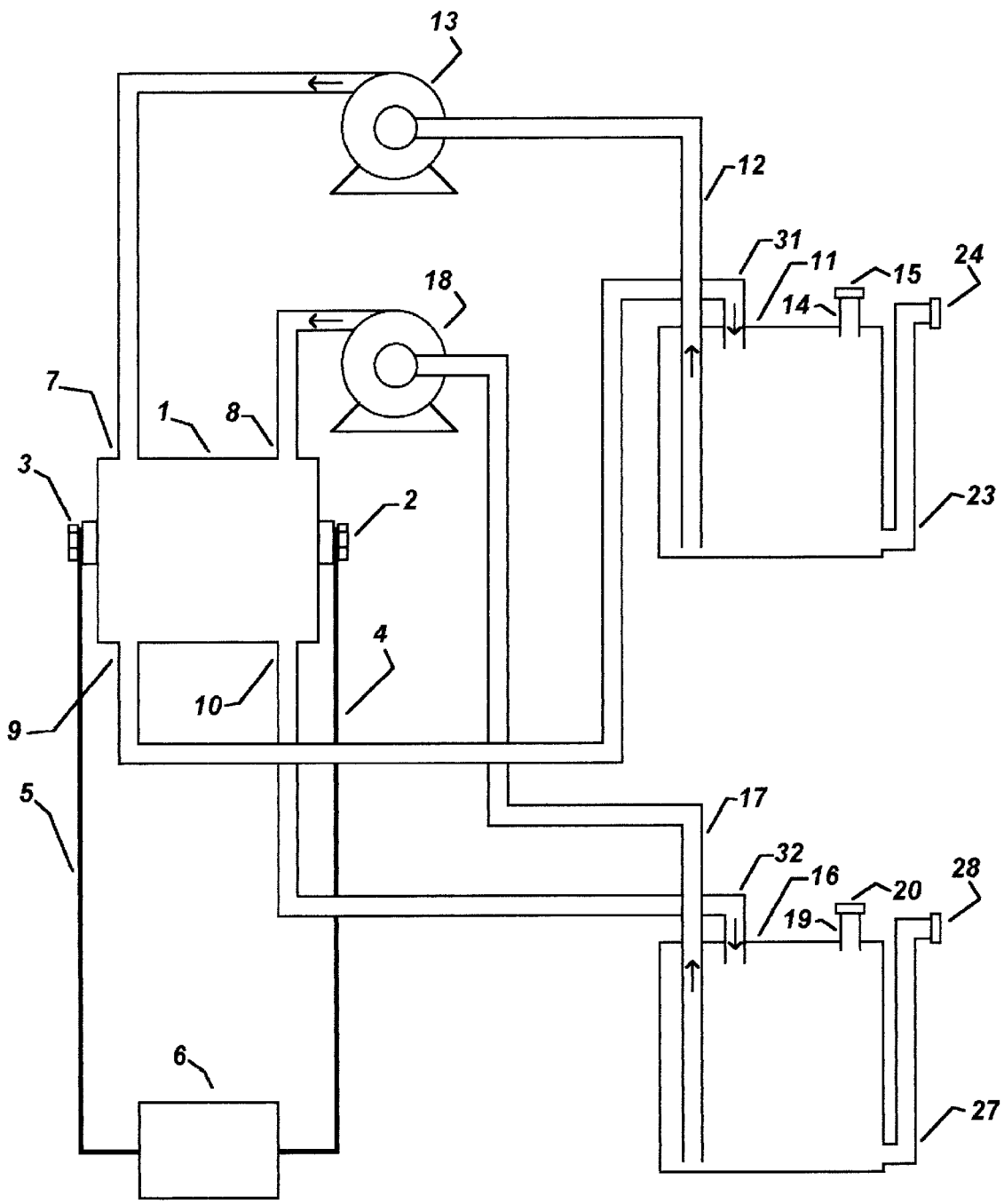
FIG. 2 shows another form in which the invention may be implemented in an electrically-powered vehicle or device.

In FIG. 2 is shown an alternative approach to the implementation of the invention as regards the energizing battery. In this approach only one tank is required for each of the electrolytes, which are recirculated through the battery. As in FIG. 1, tanks 11 and 16 contain anode and cathode electrolytes respectively, pumps 13 and 18 draw electrolytes from these tanks by way of pipes 12 and 17, and supply them to battery 1 through pipes 7 and 8. Current is drawn from terminals 2 and 3 through wires 4 and 5 to supply to load 6. Electrolytes exit the battery through pipes 9 and 10 but, in distinction to FIG. 1, they are returned to their original tanks through pipes 31 and 32.

Tanks 11 and 16 are provided with filler pipes 14 and 19, which are normally closed by caps 15 and 20. They are also provided with drain pipes 23 and 27, also normally closed by caps 24 and 28. As in the system of FIG. 1, these filler and drain pipes permit connection to the supply and extraction hoses of a charging battery system, such as, but not restricted to, those of FIG. 4 or FIG. 5.

The approach as shown in FIG. 2 has the advantage that only a single tank is required for each electrolyte, as compared with the source and drain tanks shown in FIG. 1. These source and drain tanks can each be required to hold the full volume of electrolyte and must therefore be of similar capacities. In the approach of FIG. 2 a single tank takes the place of two tanks of similar size, thus the overall volume of the tanks required is halved. This reduction in space occupied by tanks is of advantage in mobile uses of this invention, particularly as applied to vehicles. Repeated recirculation of the electrolytes may also result in more complete extraction of their energy content, by allowing oxidation or reduction of those components of the electrolytes which had not been so converted on first passage through the battery.

However, with the single tank per electrolyte approach shown in FIG. 2, it is necessary to drain the electrolyte from a tank before it can be filled with fresh (charged) electrolyte. Hence to extract all the available energy contained in the electrolytes, the battery must be operated until no more energy can be obtained, after which the tanks can be drained and refilled. To drain and refill before all available energy has been extracted would result in the loss of energy that could possibly have been obtained. In a commercial usage this would be undesirable. However, when used in an electrically powered vehicle, it is also undesirable to expect the operator to continue driving until the energy supply is exhausted, wherever the vehicle may be, or sacrifice energy that could have been used and for which payment has been made.

Figure 3:
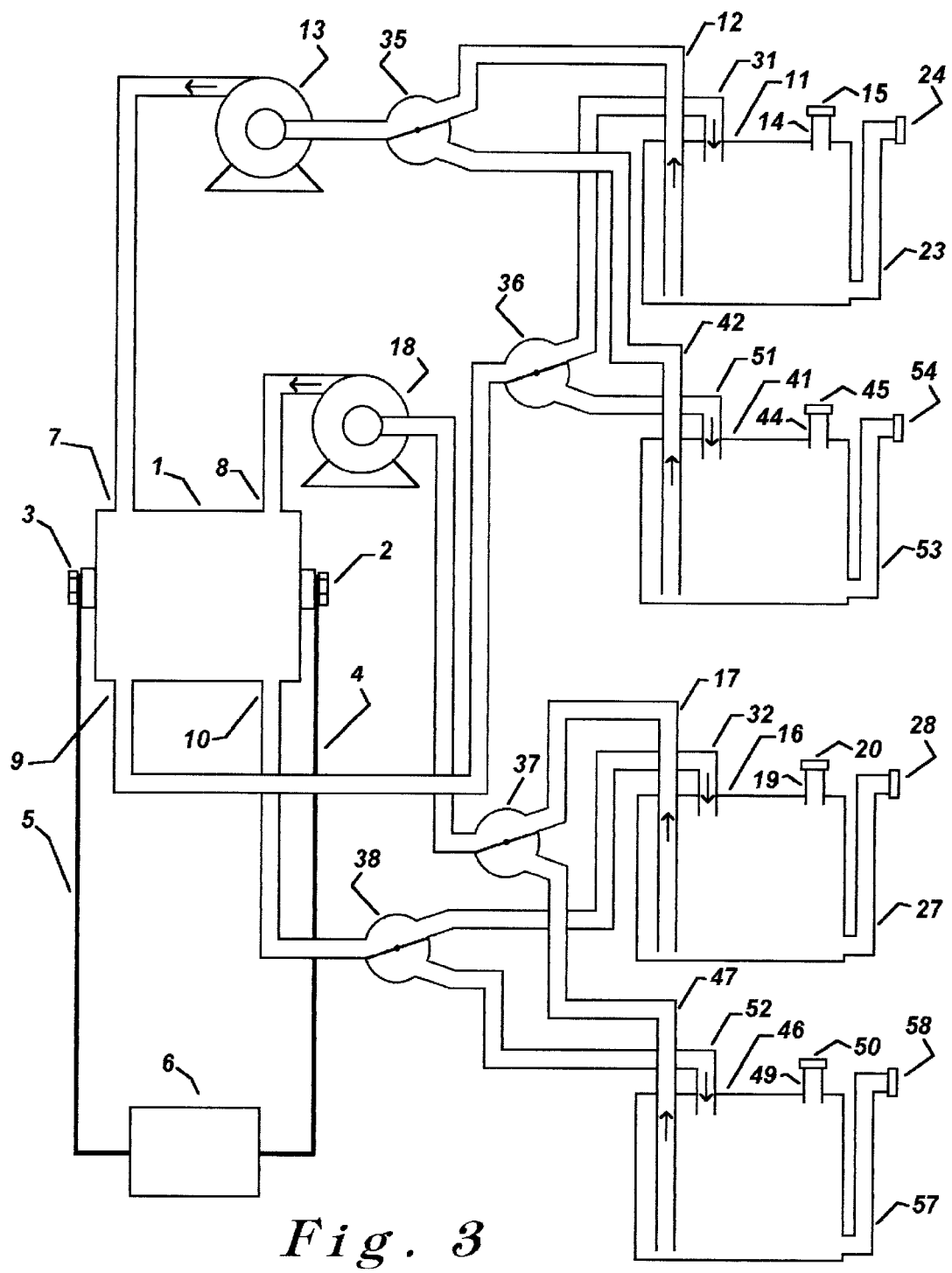
FIG. 3 shows yet another form in which the invention may be implemented in an electrically-powered vehicle or device, this being the preferred form.

In the approach shown in FIG. 3 one possible solution to this problem is depicted. In this approach there are two tanks for each electrolyte, denoted as "A" and "B", which are used alternately. To avoid occupying more space in the vehicle the total capacity of the anode electrolyte tanks may be similar to that of the anode electrolyte tank shown in FIG. 2, and likewise for the cathode electrolyte tanks, however this is optional. The sizes of the "A" and "B" tanks may be similar or different.

In FIG. 3 tanks 11 and 41 comprise the anode electrolyte "A" and "B" tanks, and tanks 16 and 46 comprise the cathode electrolyte "A" and "B" tanks, respectively. Valves 35, 36, 37, and 38 permit selection of one or other anode tanks and one or other cathode tanks. Pump 13 draws anode electrolyte from tank 11 or tank 41 by way of valve 35 and pipes 12 or 42, and supplies this electrolyte to battery 1 through pipe 7. Similarly, pump 18 draws cathode electrolyte from tank 16 or tank 46 by way of valve 37 and pipes 17 or 47, and supplies it to battery 1 through pipe 8.

As in the example of FIG. 1, the end cells of the battery are connected to terminals 2 and 3 from which current may be drawn through wires 4 and 5 to supply to load 6. Electrolytes exit the battery through pipes 9 and 10, and, as in the approach of FIG. 2, they are returned to their original tanks. Valves 36 and 38 are operated in conjunction with valves 35 and 37 respectively so that the electrolytes are returned to the tanks from whence they came, through pipe 31 or 51 for the anode electrolyte, and pipes 32 or 52 for the cathode electrolyte.

Figure 4:
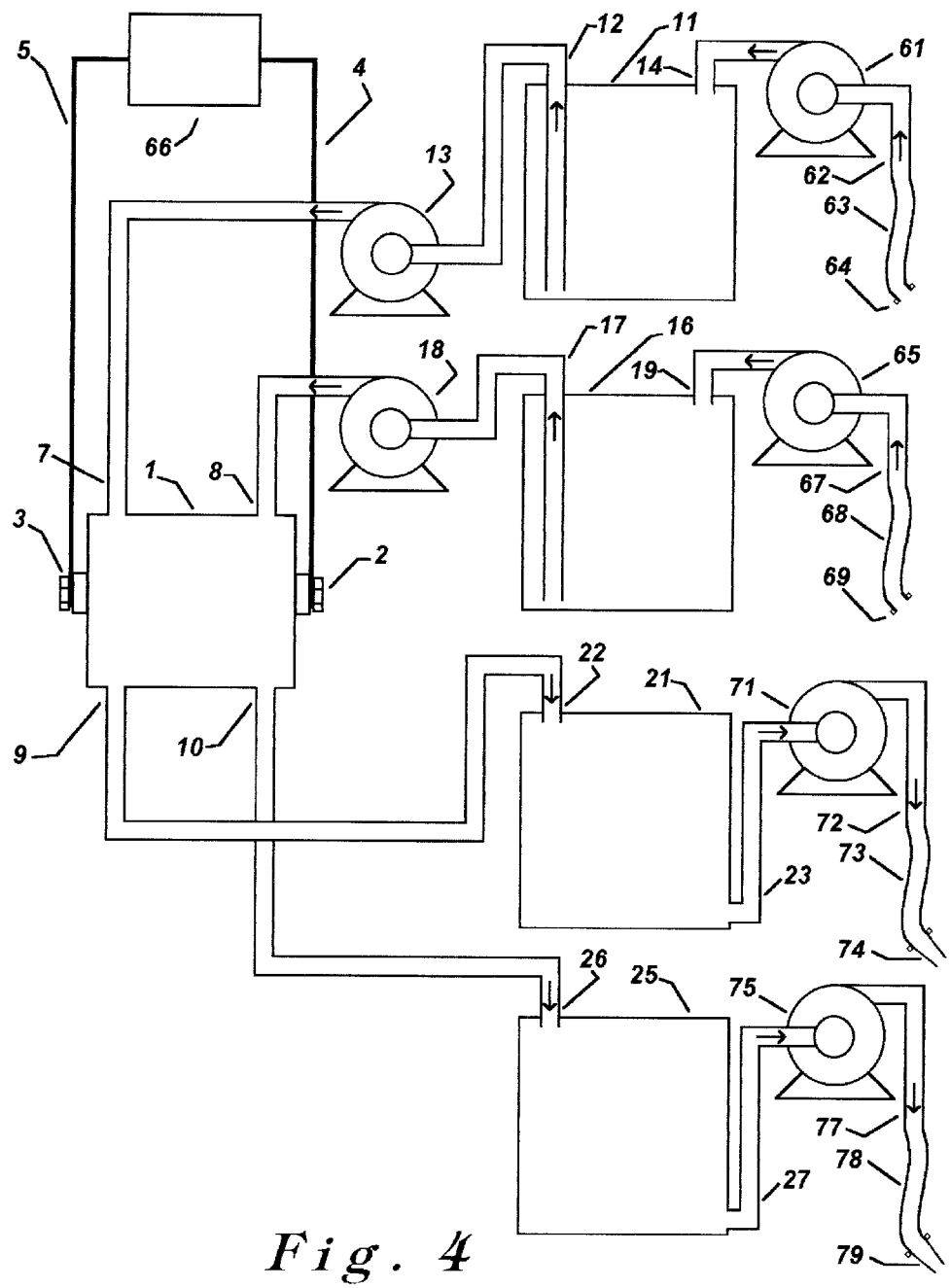
FIG. 4 shows one form for the implementation of the charging aspect of this invention at a service station or other charging battery facility.
Figure 5:
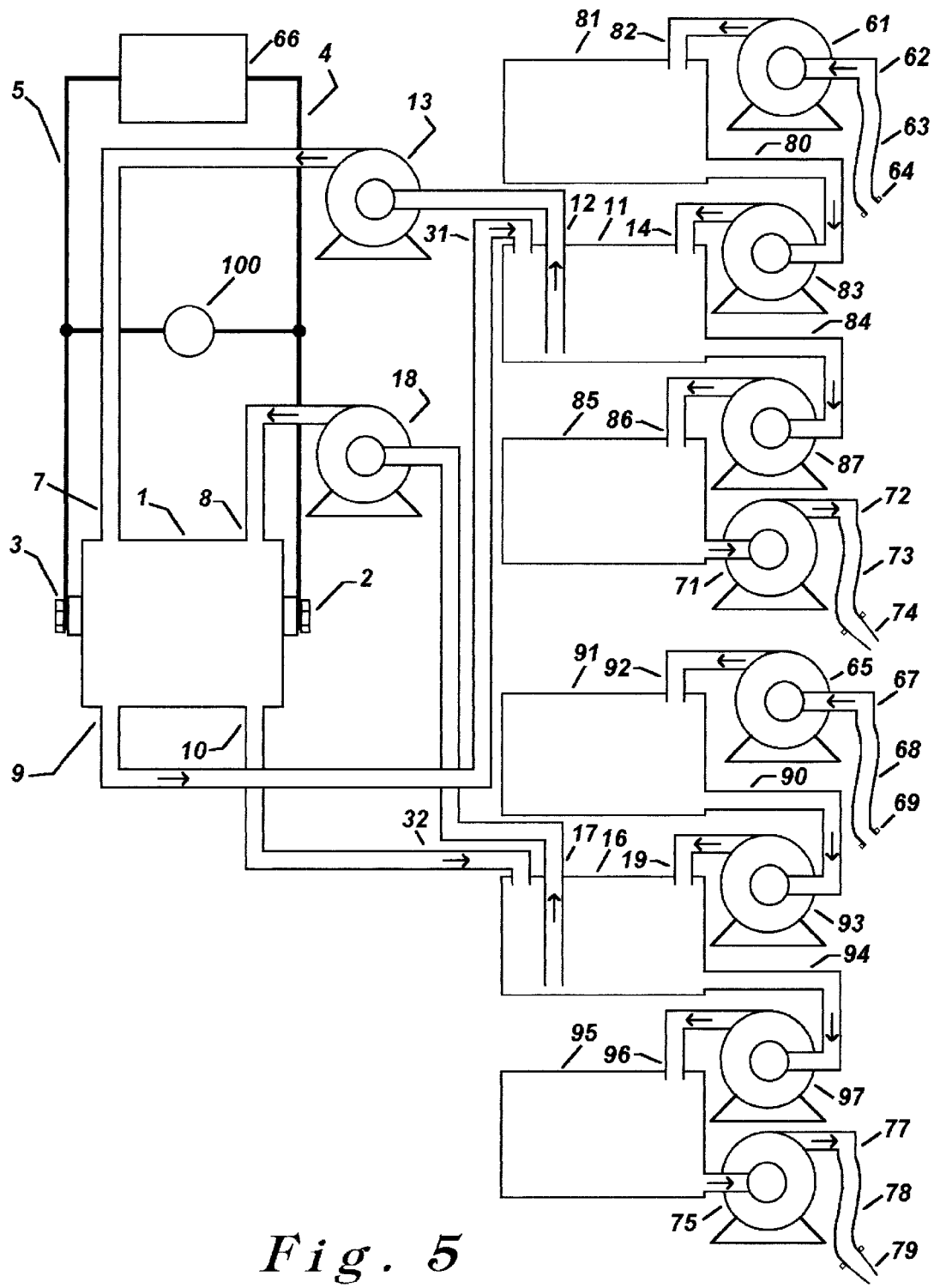
FIG. 5 shows the preferred form for the implementation of the charging aspect of this invention.

Tanks 11, 16, 41 and 46 are provided with filler pipes 14, 19, 44 and 49, normally closed by caps 15, 20, 45 and 50 respectively, and with drain pipes 23, 27, 53, and 57, also normally closed by caps 24, 28, 54 and 58 respectively, which permit connection to the supply and extraction hoses of a charging battery system, such as, but not restricted to, those of FIG. 4 or FIG. 5.

It will be apparent that a vehicle or other device powered by a battery using the approach shown in FIG. 3 may be operated with the valves set such that the "A" tanks, that is tanks 11 and 16, are in use, until such time as the total energy content of these tanks has been extracted, whereupon changeover to the "B" tanks (tanks 41 and 46) may be made, and operation continued. At a convenient time thereafter, the "A" tanks may be recharged by exchange of the discharged electrolytes for electrolytes that have been charged in a charging battery at a filling station.

Operation continues until the "B" tanks in turn have been depleted of energy, whereupon changeover to the "A" tanks is made and the "B" tanks are subsequently recharged by exchange of electrolytes at a filling station. Thus continuing operation is possible without need to drain a tank the electrolyte in which still contains available energy.

In FIG. 4 is shown a simplified approach to the implementation of the invention as regards the charging battery. The charging battery performs the complementary operations to the energizing batteries already discussed, that is, it takes discharged (oxidized) anode electrolyte and discharged (reduced) cathode electrolyte and converts them to the charged state by passage of an electric current which reduces the anode electrolyte and oxidizes the cathode electrolyte. In principle the charging battery is analogous to the energizing battery with the difference that a source of direct-current electrical power replaces the power-consuming load.

Referring to FIG. 4, at 11 is shown a tank of discharged anode electrolyte and at 16 a tank of discharged cathode electrolyte. Pump 13 draws electrolyte from tank 11 through pipe 12 and supplies it to battery 1 through input pipe 7. Similarly, pump 18 draws electrolyte from tank 16 through pipe 17 and supplies it to battery 1 through input pipe 8. A source of d.c. electric power 66 supplies current to battery 1 through wires 4 and 5 and terminals 2 and 3. The electrolytes leave the battery through exit pipes 9 and 10 which supply them to tanks 21 and 25 through filler pipes 22 and 26.

Tank 11 is provided with a filler pump 61 which has an input pipe 62 with a flexible hose 63 having a connector 64 suitable for attachment to the drain pipe of an anode electrolyte tank associated with an energizing battery, such as drain pipe 23 of FIG. 1 or FIG. 2, or drain pipes 23 or 53 of FIG. 3. Likewise tank 16 has a filler pump 65 with input pipe 67, flexible hose 68, and connector 69 suitable for connection to drain pipes such as 27 of FIG. 1 or FIG. 2, or 27 or 57 of FIG. 3.

Tanks 21 and 25, which store the charged anode and cathode electrolytes respectively, are similarly provided with pumps 71 and 75 having output pipes 72 and 77, with flexible hoses 73 and 78 which are equipped with nozzles 74 and 79, which are suited to inputting the electrolytes into the filler pipes of tanks associated with energizing batteries, such as pipes 14, 19, of FIG. 1 or FIG. 2, or pipes 14 or 44, 19 or 49, of FIG. 3.

The operation of this invention can now be understood by considering the working of FIG. 4 in conjunction with any of the schemes depicted in FIG. 1, FIG. 2, or FIG. 3. Direct current electrical power is employed to charge electrolytes in battery 1 of FIG. 4. The charged electrolytes are subsequently physically transferred to the tanks supplying the energizing batteries as depicted in FIG. 1, FIG. 2, or FIG. 3, while the used, that is discharged, electrolytes from said energizing batteries are recovered and transferred into the tanks which supply the charging battery, such as battery 1 of FIG. 4.

The configuration of tanks shown in FIG. 4 is shown to assist in understanding the invention and, while theoretically operable, is not the preferred implementation of the charging battery functions. It will be appreciated that, using the arrangement of FIG. 4, it would be necessary to complete the charging of the electrolytes before storing them in the charged electrolyte tanks, in order that the electrolytes transferred to the energizing batteries should be fully charged.

In FIG. 5 is shown a preferred approach to the implementation of the charging battery functions. FIG. 5 resembles FIG. 4 to the extent that at 11 there is a tank of discharged anode electrolyte and at 16 a tank of discharged cathode electrolyte. Pump 13 draws electrolyte from tank 11 through pipe 12 and supplies it to battery 1 through input pipe 7. Similarly, pump 18 draws electrolyte from tank 16 through pipe 17 and supplies it to battery 1 through input pipe 8. Direct current electric power source 66 provides current to battery 1 through wires 4 and 5 and terminals 2 and 3. The electrolytes leave the battery through exit pipes 9 and 10. However at this point FIG. 5 differs from FIG. 4 in that the electrolytes are returned to the tanks 11 and 16, through pipes 31 and 32, thus being continually recirculated through the battery.

After a time sufficient for the electrolytes in tanks 11 and 16 to become fully charged, pumps 87 and 97 are activated, transferring electrolytes from tanks 11 and 16 to tanks 85 and 95 by way of pipes 86 and 96. The electrolytes may be retained in the latter tanks until such time as they are required to refill the tanks associated with an energizing battery such as tanks 11 and 16 of FIG. 1 or FIG. 2, or tanks 11 or 41, and 16 or 46 of FIG. 3. It will thus be apparent that the configuration of FIG. 5 constitutes an energy storage system; the charged energy-containing electrolytes being stored in tanks 85 and 95 until needed. Voltage measuring means 100 may be connected between the terminals 2 and 3 of battery 1 to provide indication of the state of charge of the electrolytes to inform when operation of pumps 87 and 97 should be initiated.

When electrolytes are withdrawn from tanks 11 and 16 by pumps 87 and 97, the filling pumps 83 and 93 are also activated. These draw discharged electrolytes from tanks 81 and 91, by way of pipes 80 and 90, and deliver them to tanks 11 and 16 by way of pipes 14 and 19. Tanks 11 and 16 are thus kept continually filled.

Tank 81 is filled with discharged anode electrolyte, and tank 91 with discharged cathode electrolyte, obtained from an energizing battery such as those depicted in FIG. 1, FIG. 2, or FIG. 3. This action will normally take place at the same time as the tanks associated with the energizing battery are being filled from tanks 85 and 95, so that the discharged electrolytes from the energizing battery are replaced with charged electrolytes.

To perform these transfers of electrolytes to and from the energizing battery, pumps 61, 71, 65, and 75 are activated. Pumps 61 and 65 have input pipes 62 and 67 with flexible hoses 63 and 68 having connectors 64 and 69 suitable for attachment to the drain pipes of the electrolyte tanks associated with an energizing battery, such as drain pipes 23 and 27 of FIG. 1 or FIG. 2, or drain pipes 23 or 53 and 27 or 57 of FIG. 3, thereby transferring the discharged electrolytes from the tanks related to the energizing battery to tanks 81 and 91 through filler pipes 82 and 92. Pumps 71 and 75 draw electrolytes from tanks 85 and 95 and supply them to output pipes 72 and 77 fitted with flexible hoses 73 and 78 having nozzles 74 and 79 suitable to inputting the electrolytes into the filler pipes of tanks associated with energizing batteries such as pipes 14, 19, of FIG. 1 or FIG. 2, or pipes 14 or 44, 19 or 49, of FIG. 3, thus filling the tanks connected to the energizing battery with charged electrolytes.

In the preceding description it has been assumed that two electrolytes are transferred between the charging batteries and the energizing batteries. However this invention is not to be considered as restricted to the transfer of two, and only two, fluids. For example U.S. Pat. No. 5,612,148 describes a cell having a buffer chamber interposed between the positive and negative chambers of the cell through which an idler electrolyte circulates. The principles of this invention may also be used to transfer three fluids between the charging and energizing batteries.

While in the preceding description approaches to the implementation of this invention have been set forth, this preceding description is not intended to be in any way restrictive or limiting of the embodiment of the invention. It will be apparent to those skilled in the art that many of the details described above can be varied without departing from the basic principles of the invention.

What I claim as my invention is:

1. A rechargeable electric storage battery which is recharged by the exchange of liquid electrolytes with any of a plurality of separate and distinct charging batteries, said separate and distinct charging batteries being recharged by the passage of an electric current.

* * * * *